(12) United States Patent
Park

(10) Patent No.: US 11,812,872 B2
(45) Date of Patent: Nov. 14, 2023

(54) MEMBER FOR CHAIR FOR IMPLEMENTING MULTI-CHANNEL SOUND SYSTEM AND CHAIR INCLUDING THE MEMBER

(71) Applicant: TROUND INC., Hanam-si (KR)

(72) Inventor: Jea Bum Park, Namyangju-si (KR)

(73) Assignee: TROUND INC., Hanam-si (KR)

( * ) Notice: Subject to any disclaimer, the term of this patent is extended or adjusted under 35 U.S.C. 154(b) by 0 days.

(21) Appl. No.: 18/045,990

(22) Filed: Oct. 12, 2022

(65) Prior Publication Data

US 2023/0059033 A1  Feb. 23, 2023

Related U.S. Application Data

(63) Continuation of application No. PCT/KR2021/007053, filed on Jun. 7, 2021.

(30) Foreign Application Priority Data

Jun. 16, 2020 (KR) ........................ 10-2020-0072934

(51) Int. Cl.
*A47C 7/72* (2006.01)
*F16M 11/04* (2006.01)
(Continued)

(52) U.S. Cl.
CPC ............. *A47C 7/727* (2018.08); *F16M 11/04* (2013.01); *F16M 11/041* (2013.01);
(Continued)

(58) Field of Classification Search
CPC ........ A47C 7/727; H04R 5/023; H04R 1/026; B60N 2/879
(Continued)

(56) References Cited

U.S. PATENT DOCUMENTS 2,148,347 A * 2/1939 Gray ................... A61G 15/125
128/845
2,527,656 A * 10/1950 Reinsdorf ................ A47C 7/38
381/388
(Continued)

FOREIGN PATENT DOCUMENTS

CN  212850974 U  *  3/2021  ............... A47C 7/38
JP  2006-345477 A  12/2006
(Continued)

OTHER PUBLICATIONS

International Search Report issued in PCT/KR2021/007053; dated Sep. 3, 2021.
(Continued)

*Primary Examiner* — Robert Canfield
(74) *Attorney, Agent, or Firm* — Studebaker & Brackett PC

(57) ABSTRACT

The present invention relates to a member for a chair for implementing a multi-channel sound system and a chair including the member, and more particularly, to a member for a chair, the member having a plurality of speakers installed therein to implement a multi-channel sound system and installed in a chair to provide sound environments having a sense of space and a three-dimensional effect to a user who sits in the chair, and a chair including the member.

18 Claims, 22 Drawing Sheets

(51) Int. Cl.
  *H04R 5/02* (2006.01)
  *H04S 3/00* (2006.01)
  *F16M 13/02* (2006.01)
  *F16M 11/10* (2006.01)

(52) U.S. Cl.
  CPC ......... *F16M 11/045* (2013.01); *F16M 11/046* (2013.01); *F16M 11/10* (2013.01); *F16M 13/022* (2013.01); *H04R 5/023* (2013.01); *H04S 3/008* (2013.01); *H04S 2400/01* (2013.01)

(58) Field of Classification Search
  USPC ...................................... 297/217.4; 381/388
  See application file for complete search history.

(56) References Cited

U.S. PATENT DOCUMENTS

| | | | | | |
|---|---|---|---|---|---|
| 2,629,023 | A * | 2/1953 | La Fitte | ................ | H04M 1/05 381/151 |
| 3,098,128 | A * | 7/1963 | Audin | ................ | A61G 15/125 5/904 |
| 3,512,605 | A * | 5/1970 | McCorkle | ............ | B60N 2/812 381/301 |
| 3,976,162 | A * | 8/1976 | Cummings | ............ | H04R 1/02 381/302 |
| 4,042,791 | A * | 8/1977 | Wiseman | ............ | H04R 5/023 5/904 |
| 4,075,438 | A * | 2/1978 | Kappel | ................ | H04R 5/023 381/301 |
| 4,156,117 | A * | 5/1979 | Phillips | ................ | H04R 5/023 381/387 |
| 4,210,784 | A * | 7/1980 | Phillips | ................ | H04R 5/023 381/387 |
| 4,440,443 | A * | 4/1984 | Nordskog | ............ | B60N 2/882 297/217.4 |
| 4,638,884 | A * | 1/1987 | Lee | ................ | H04R 5/023 181/146 |
| 5,887,071 | A * | 3/1999 | House | ................ | H04R 5/02 381/87 |
| 5,889,875 | A * | 3/1999 | Caron | ................ | A47C 7/727 381/345 |
| 6,419,321 | B1 * | 7/2002 | Sack | ................ | A61G 5/12 297/405 |
| 6,527,237 | B2 * | 3/2003 | Harary | ................ | H04R 1/026 248/221.11 |
| 8,553,890 | B2 * | 10/2013 | Yokota | ................ | H04R 5/023 381/1 |
| 8,950,813 | B2 * | 2/2015 | Nawaz | ................ | B60N 2/885 297/398 |
| 10,239,432 | B2 * | 3/2019 | Subat | ................ | B60N 2/812 |
| 10,477,303 | B1 * | 11/2019 | Kapolnek | ............ | H04R 1/025 |
| 10,715,895 | B2 * | 7/2020 | Tracy | ................ | H04R 1/025 |
| 11,367,428 | B2 * | 6/2022 | Soltner | ............ | G10K 11/17817 |
| 2005/0201581 | A1 * | 9/2005 | Supinski | ................ | H04R 5/023 381/301 |
| 2007/0101604 | A1 * | 5/2007 | Brazier | ................ | A45D 20/42 34/96 |
| 2012/0170788 | A1 * | 7/2012 | Jagne | ................ | H04R 1/1091 381/380 |
| 2019/0106039 | A1 * | 4/2019 | Winton | ................ | H04R 5/023 |
| 2020/0128312 | A1 * | 4/2020 | Christoph | ............ | H04R 1/025 |
| 2020/0238873 | A1 * | 7/2020 | Akaike | ................ | B60N 2/879 |
| 2020/0398722 | A1 * | 12/2020 | Soltner | ................ | H04R 1/2857 |
| 2021/0127841 | A1 * | 5/2021 | Park | ................ | A47C 7/727 |
| 2021/0129708 | A1 * | 5/2021 | Kim | ................ | G01L 5/00 |
| 2022/0225018 | A1 * | 7/2022 | Hayasaka | ............ | H04R 1/025 |
| 2023/0054544 | A1 * | 2/2023 | Park | ................ | A47C 7/727 |
| 2023/0148758 | A1 * | 5/2023 | Park | ................ | A47C 7/38 297/217.4 |
| 2023/0165378 | A1 * | 6/2023 | Park | ................ | H04R 1/026 297/217.4 |
| 2023/0179918 | A1 * | 6/2023 | Park | ................ | A47C 7/727 381/301 |

FOREIGN PATENT DOCUMENTS

| | | | |
|---|---|---|---|
| JP | 2008-271600 A | | 11/2008 |
| JP | 2009-017278 A | | 1/2009 |
| JP | 2018-094179 A | | 6/2018 |
| KR | 10-2004-0026541 A | | 3/2004 |
| KR | 20100071321 A | * | 6/2010 |
| KR | 20210090410 A | * | 7/2021 |
| KR | 20210141016 A | * | 11/2021 |
| KR | 102352425 B1 | * | 1/2022 |
| KR | 20220005266 A | | 1/2022 |
| KR | 20220030078 A | * | 3/2022 |
| WO | WO-2020234317 A1 | * | 11/2020 |

OTHER PUBLICATIONS

"Notice of Final Rejection" Office Action issued in KR 10-2020-0072934; mailed by the Korean Intellectual Property Office dated Feb. 18, 2022.

"Written Decision on Registration" Office Action issued in KR 10-2020-0072934; mailed by the Korean Intellectual Property Office dated Feb. 25, 2022.

* cited by examiner

MEMBER FOR CHAIR FOR IMPLEMENTING MULTI-CHANNEL SOUND SYSTEM AND CHAIR INCLUDING THE MEMBER

CROSS-REFERENCE TO RELATED APPLICATION

This application is based on the PCT Application No. PCT/KR2021/007053, filed on Jun. 7, 2021, and claims the benefit of priority from the Korean Patent Application No. 10-2020-0072934, filed on Jun. 16, 2020, the disclosure of which is incorporated herein by reference in its entirety.

BACKGROUND

1. Field of the Invention

The present invention relates to a member for a chair for implementing a multi-channel sound system and a chair including the member, and more particularly, to a member for a chair, the member having a plurality of speakers installed therein to implement a multi-channel sound system and installed in a chair to provide sound environments having a sense of space and a three-dimensional effect to a user who sits in the chair, and a chair including the member.

2. Discussion of Related Art

In general, a speaker used while being connected to a computer generates sound by converting a current flowing through a wire into an electrical signal and a vibration signal and generating vibrations using a vibration portion.

For example, when watching a movie or playing a game using a computer, a user not only watches images on a screen of the computer but also listens to sounds due to an electrical signal being transferred and vibrations generated by a speaker corresponding to the images being transferred to ears of the user while the user sits in a chair where a monitor of the computer is seen.

Particularly, a multi-channel sound system including a plurality of such speakers has an advantage of allowing a user to more exquisitely experience a direction, level, and the like of a sound in an image.

However, in order to implement such multi-channel sound systems, it is necessary to provide a plurality of speakers above and below a desk, behind a chair, and the like and to electrically connect all of the plurality of speakers such that there is a great restriction in space.

Also, although a multi-channel sound system is implemented by arranging the plurality of speakers, there is a problem that a position of the chair is changed or a variety of physical interferences are present between the speakers and the user who sits in the chair.

SUMMARY OF THE INVENTION

The present invention is directed to providing a member for a chair, the member having a plurality of speakers installed therein to implement a multi-channel sound system and installed in a chair to provide sound environments having a sense of space and a three-dimensional effect to a user who sits in the chair and to easily install a speaker in a chair on which a speaker is not mounted, and a chair including the member.

According to one aspect of the present invention, there is provided a member for a chair for implementing a multi-channel sound system, the member including at least one main frame having a shape that extends a predetermined length in a z-axis direction perpendicular to the ground and speaker mounting portions which are cross-connected to the main frame, extend from both sides of the main frame in a y-axis direction facing the front from the main frame, and in which an area for installing at least one speaker is defined.

Also, according to another aspect of the present invention, there is provided a chair including at least 1) a headrest portion configured to support a head part of a user, 2) a backrest portion configured to support a back and waist part of the user, and 3) a seat portion configured to support a buttocks part and a part of legs of the user, the chair having the member installed in at least one selected from the headrest portion, the backrest portion, and the seat portion to receive a multi-channel sound signal and implement a multi-channel sound system.

According to the present invention, there is an advantage of changing a general chair to a chair in which a multi-channel sound system is implemented by installing a member for the chair in which the multi-channel sound system is implemented, in a headrest portion, a backrest portion, and/or a seat portion of the chair.

In particular, by providing a fixing device that can tilt in various directions, the member for the chair has an advantage of being applicable to various forms of chairs.

DETAILED DESCRIPTION OF EXEMPLARY EMBODIMENTS

Hereinafter, a member for a chair for implementing a multi-channel sound system and a chair including the member according to some embodiments of the present invention will be described in detail.

According to one aspect of the present invention, there is provided a member for a chair for implementing a multi-channel sound system, the member including at least one main frame having a shape that extends a predetermined length in a z-axis direction perpendicular to the ground and speaker mounting portions which are cross-connected to the main frame, extend from both sides of the main frame in a y-axis direction facing the front from the main frame, and in which an area for installing at least one speaker is defined.

The speaker mounting portion may be present on a plane parallel to the ground. Hereinafter, although, for convenience, the speaker mounting portion will be described as being divided into a first speaker mounting portion installed on one side of the main frame and a second speaker mounting portion installed on the other side of the main frame, the first speaker mounting portion and the second speaker mounting portion may be integrally provided. Also, when the speaker mounting portion further includes a third speaker mounting portion, the first speaker mounting portion, the second speaker mounting portion, and the third speaker mounting portion may be integrally provided.

Figure 1:
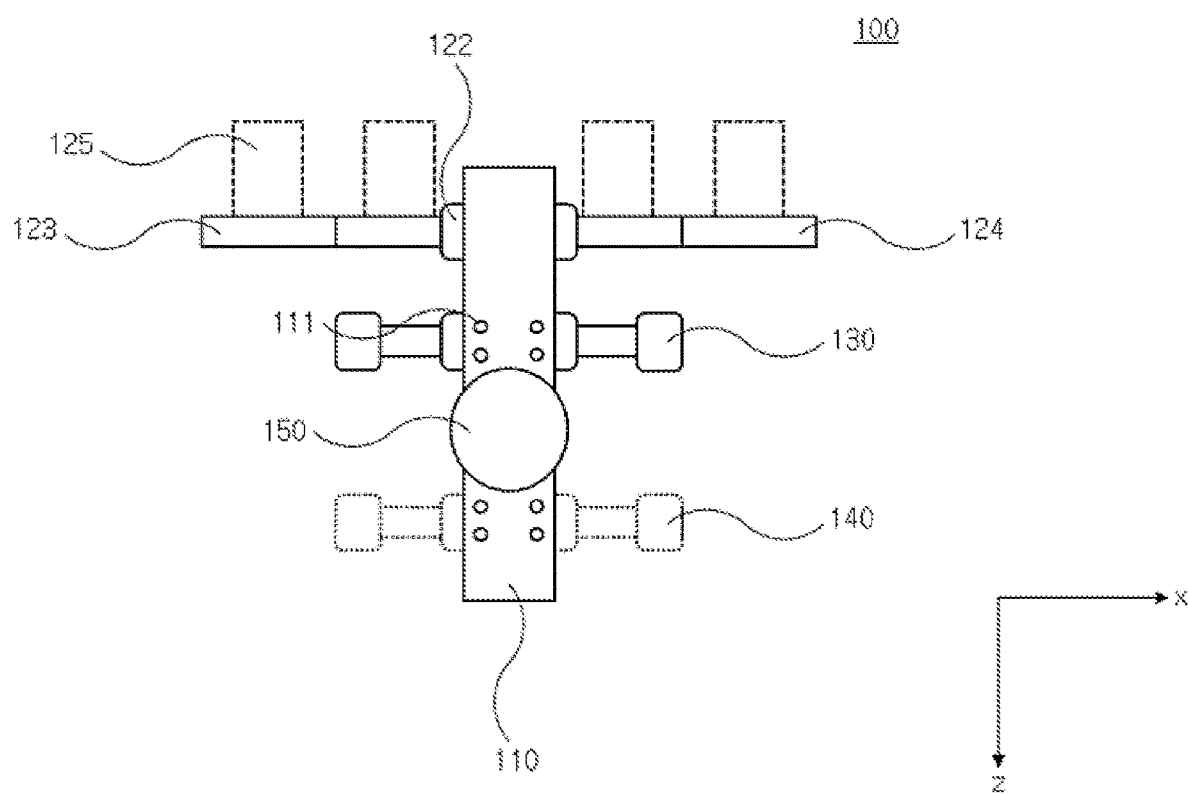
FIG. 1 is a front view of a member for a chair according to one embodiment of the present invention.
Figure 2:
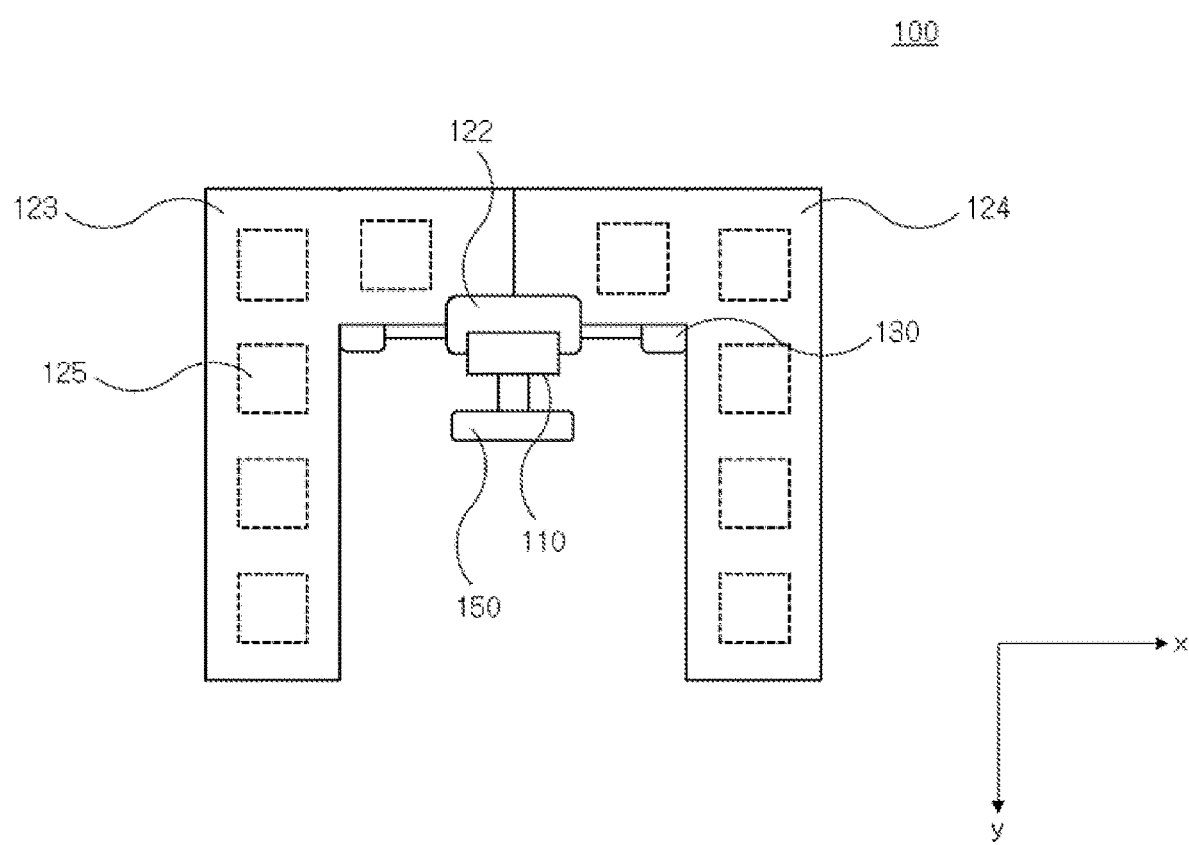
FIG. 2 is a top view of the member illustrated in FIG. 1.
Figure 3:
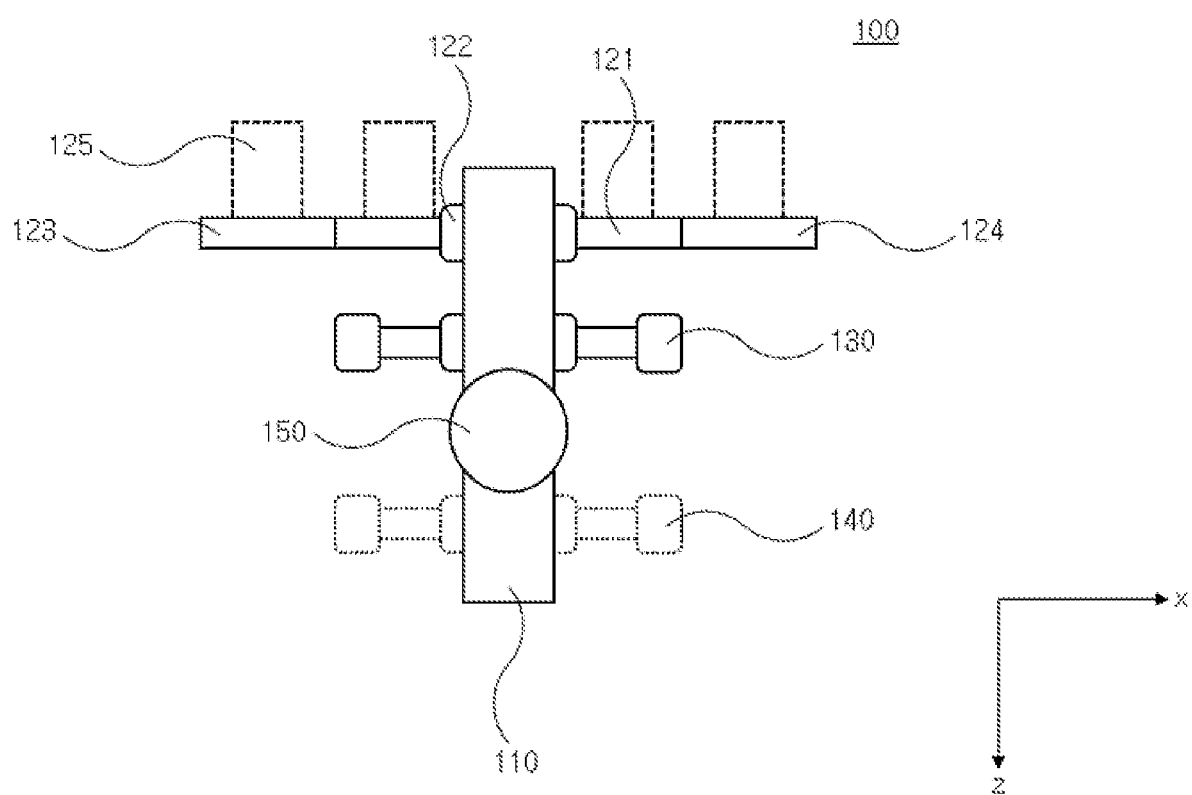
FIG. 3 is a front view of a member for a chair according to another embodiment of the present invention.
Figure 4:
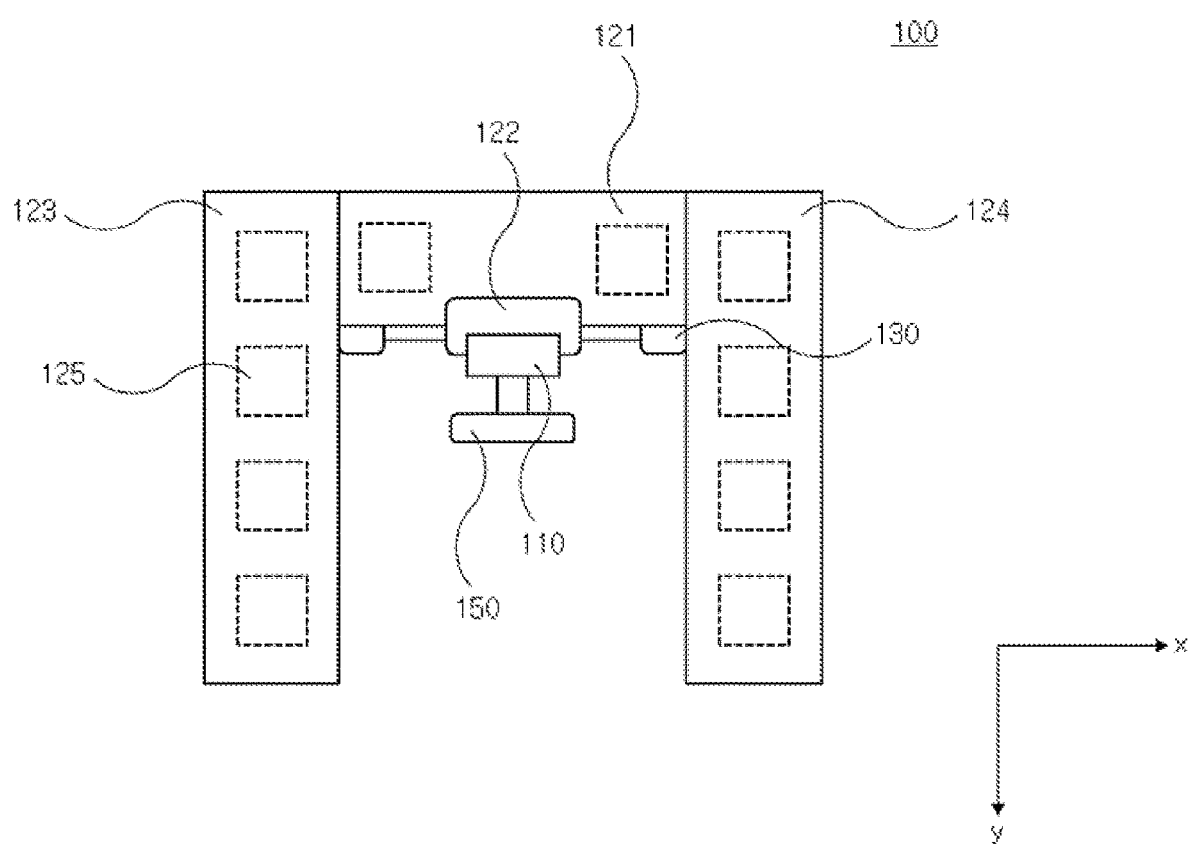
FIG. 4 is a top view of the member illustrated in FIG. 3.
Figure 5:
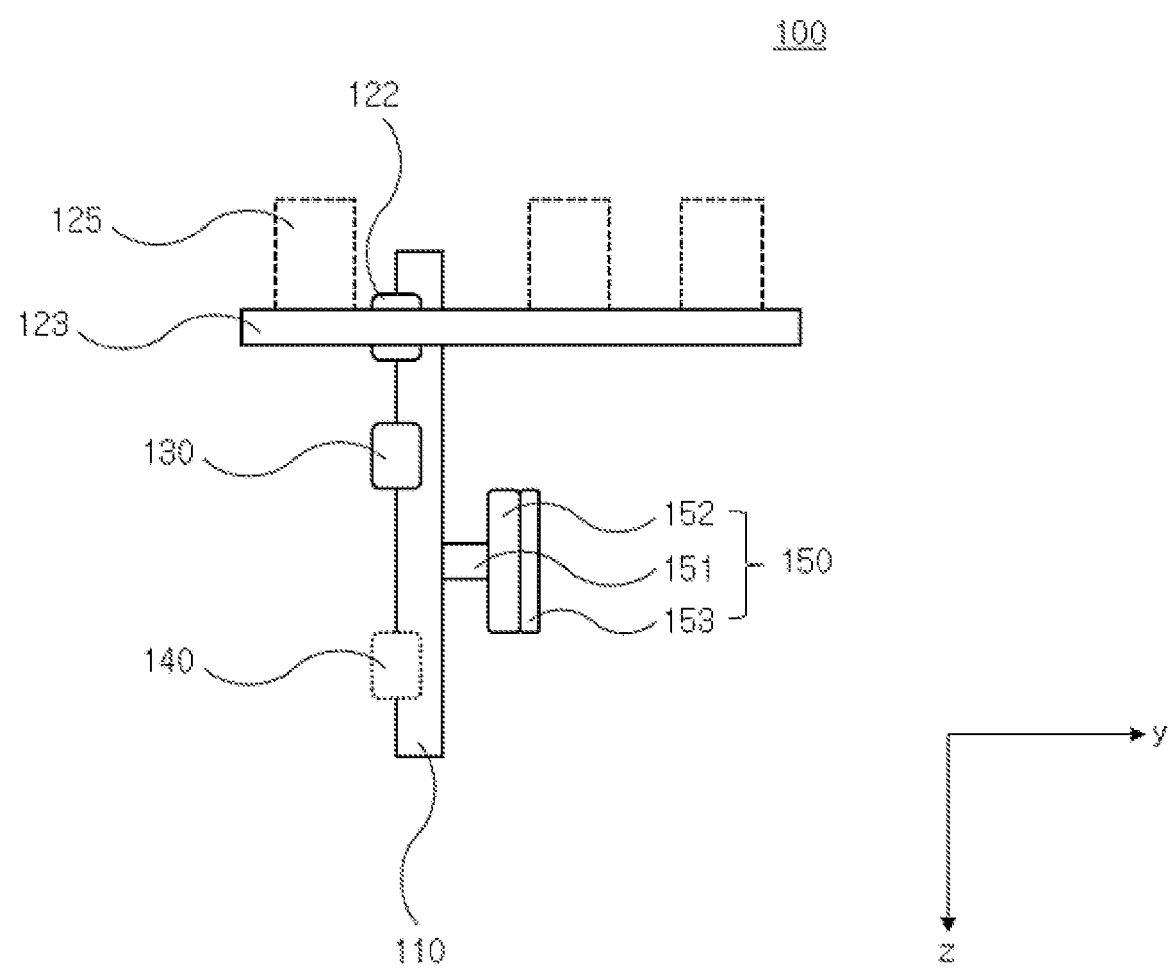
FIG. 5 is a lateral view of the member illustrated in FIG. 3.

FIG. 1 is a front view of a member for a chair according to one embodiment of the present invention, FIG. 2 is a top view of the member illustrated in FIG. 1, FIG. 3 is a front view of a member for a chair according to another embodiment of the present invention, FIG. 4 is a top view of the member illustrated in FIG. 3, and FIG. 5 is a lateral view of the member illustrated in FIG. 3.

A member 100 for a chair for implementing a multi-channel sound system according to one embodiment of the present invention illustrated in FIGS. 1 and 2 includes at least one main frame 110 provided to extend in the z-axis direction, a first speaker mounting portion 123 and a second speaker mounting portion 124 which are provided on both sides of the main frame 110, extend forward in the y-axis direction from the main frame 110 while being spaced apart from each other, and in which an area for installing at least one speaker is defined, and one or more fixing devices 130 and 140 configured to fix the main frame 110 to a chair, and the main frame 110 may also be provided as a plurality of main frames 110 depending on the shape of the chair.

Meanwhile, a member 100 for a chair for implementing a multi-channel sound system according to another embodiment of the present invention illustrated in FIGS. 3 to 5 includes a main frame 110 provided to extend in the z-axis direction, a third speaker mounting portion 121 which is installed on the main frame 110, provided to extend in an x-axis direction, and in which an area for installing at least one speaker 125 is defined, a first speaker mounting portion 123 and a second speaker mounting portion 124 which are provided on both sides of the third speaker mounting portion 121, extend in the y-axis direction, and in which an area for installing at least one speaker 125 is defined, and one or more fixing devices 130 and 140 configured to fix the main frame 110 to a chair.

The speakers 125 installed in the first speaker mounting portion 123, the second speaker mounting portion 124, and the third speaker mounting portion 121 may be speakers in the form of a complete product, speaker units connected to driving portions separately provided at the first speaker mounting portion 123, the second speaker mounting portion 124, and the third speaker mounting portion 121 and configured to operate as a complete product, display type speakers, thin-film type speakers, or one-way and multi-way speakers, and the speakers 125 may operate through wires or operate wirelessly.

Also, the speakers 125 may be directly installed in the first speaker mounting portion 123, the second speaker mounting portion 124, and the third speaker mounting portion 121, but the present invention is not necessarily limited thereto, and a separate speaker installation stand may be interposed between the first speaker mounting portion 123, the second speaker mounting portion 124, and the third speaker mounting portion 121 and the speakers 125.

Also, the member 100 according to various embodiments of the present invention may be provided in a form in which speakers are integrally installed in the first speaker mounting portion 123, the second speaker mounting portion 124, and the third speaker mounting portion 121.

The x-axis, y-axis, and z-axis directions used to indicate directions in which the main frame 110, the third speaker mounting portion 121, the first speaker mounting portion 123, and the second speaker mounting portion 124 extend in the member 100 basically match the directions illustrated in FIGS. 1 to 5, but it should be understood that the types of axes indicating the directions may be referred to differently according to convenience.

Referring to FIGS. 1 and 2, the first speaker mounting portion 123 and the second speaker mounting portion 124 may each have one end portion installed on the main frame 110 and the other end portion provided to extend forward in the y-axis direction.

Here, the first speaker mounting portion 123 and the second speaker mounting portion 124 are spaced apart from each other, and accordingly, the first speaker mounting portion 123 and the second speaker mounting portion 124 may, when viewed from the top, constitute a right-angled C-shape (or an angular U-shape or an O-shape with one open end portion).

However, for convenience, FIG. 2 illustrates the first speaker mounting portion 123 and the second speaker mounting portion 124 as constituting an angular shape, and as the first speaker mounting portion 123 and the second speaker mounting portion 124 have one area provided in a bent shape, the first speaker mounting portion 123 and the second speaker mounting portion 124 may, when viewed from the top, constitute a U-shape, an O-shape with one open end portion, a semicircular shape, or the like. Such shapes may be equally applied even when the third speaker mounting portion, which will be describe below, is present.

Also, in this application, the first speaker mounting portion 123 and the second speaker mounting portion 124 are separately indicated to be described as being provided to each extend forward in the y-axis direction from a left side and a right side (or the right side and the left side) of the main frame 110, and the first speaker mounting portion 123 and the second speaker mounting portion 124 may be integrally provided.

The first speaker mounting portion 123 is provided to extend toward the right side of the y-axis direction and has an area for installing at least one speaker defined on one side, and the second speaker mounting portion 124 is provided to extend toward the left side of the y-axis direction, which is a direction symmetrical to the direction toward the right side, and has an area for installing at least one speaker defined on one side.

The first speaker mounting portion 123 and the second speaker mounting portion 124 may be configured to have a flat upper surface to stably install a speaker thereon but are not necessarily limited thereto. Also, a groove or a rail may be provided as necessary so that the installed speaker slidably moves therein, or the installed speaker may axially rotate on the first speaker mounting portion 123 and the second speaker mounting portion 124.

Also, a speaker protection structure or the like may be further installed to prevent physical impact from being applied to speakers installed in the first speaker mounting portion 123 and the second speaker mounting portion 124, and a sound collecting plate or a soundproofing plate may be installed to reduce loss of sound generated from the speakers.

The member 100 may be installed in a headrest portion, a backrest portion, and/or a seat portion of a chair with the fixing devices 130 and 140 as media, and accordingly, there is an advantage of changing a general chair to a chair in which a multi-channel sound system is implemented, without any structural change.

The fixing devices 130 and 140 are not particularly limited as long as the fixing devices 130 and 140 are devices suitable to install the member 100 in a headrest portion, a backrest portion, and/or a seat portion of a chair, and as a method of fixing or installing the member 100 using the fixing devices 130 and 140, processes of screw-coupling, knot-coupling, magnet-coupling, adhesion-coupling, hanger loop-coupling, groove-protrusion coupling, claw-coupling, pressure-coupling using an elastic body, and the like may be applied. When a knot-coupling process or the like is applied, an opening 111 for tying a knot may be provided in the main frame 110.

The third speaker mounting portion 121, the first speaker mounting portion 123, and the second speaker mounting portion 124 may be installed directly or indirectly on the main frame 110.

The first speaker mounting portion 123, the second speaker mounting portion 124, and the third speaker mounting portion 121 may be installed on the main frame 110 with a moving portion 122 as a medium. The moving portion 122 will be described below. The third speaker mounting portion 121 is installed on the main frame 110 and, simultaneously, serves to fix the first speaker mounting portion 123 and the second speaker mounting portion 124 provided on both sides thereof. The third speaker mounting portion 121 may have a shape that extends in a direction vertically intersecting a direction in which the main frame 110 extends, that is, a shape that extends in the x-axis direction, and an area for installing at least one speaker 125 may be defined in the third speaker mounting portion 121.

When at least two speakers are installed in the third speaker mounting portion 121, the at least two speakers may be installed to be spaced at a certain interval apart from each other.

Also, the first speaker mounting portion 123 and the second speaker mounting portion 124 may be provided on both sides of the third speaker mounting portion 121, and as in the third speaker mounting portion 121, an area for installing at least one speaker may be defined in the first speaker mounting portion 123 and the second speaker mounting portion 124.

Also, when at least two speakers are installed in the first speaker mounting portion 123 and the second speaker mounting portion 124, the at least two speakers may be installed to be spaced at a certain interval apart from each other.

The first speaker mounting portion 123 and the second speaker mounting portion 124 may have a shape that extends in a direction horizontally intersecting a direction in which the third speaker mounting portion 121 extends, that is, a shape that extends in the y-axis direction.

Meanwhile, the first speaker mounting portion 123 and the second speaker mounting portion 124 may be separate components from the third speaker mounting portion 121 and may be installed to be fixed to or detachable from the third speaker mounting portion 121 with a separate fixing or installing device as a medium, but the present invention is not necessarily limited thereto, and the third speaker mounting portion 121, the first speaker mounting portion 123, and the second speaker mounting portion 124 may be integrally formed.

In addition, although the third speaker mounting portion 121, the first speaker mounting portion 123, and the second speaker mounting portion 124 are illustrated as having a linear shape in the accompanying drawings, according to another modified example of the present invention, at least one of the third speaker mounting portion 121, the first speaker mounting portion 123, and the second speaker mounting portion 124 may have a curved shape or a broken-line shape. For example, when the third speaker mounting portion 121, the first speaker mounting portion 123, and the second speaker mounting portion 124 have a curved shape, one or more speakers installed in the third speaker mounting portion 121, the first speaker mounting portion 123, and the second speaker mounting portion 124 may be disposed to maintain the same interval from a user who sits in the chair in which the member 100 is installed.

For example, one end of the first speaker mounting portion 123 and one end of the second speaker mounting portion 124 may be installed to each be fixed to both sides of the third speaker mounting portion 121, and the other end of the first speaker mounting portion 123 and the other end of the second speaker mounting portion 124, which are not fixed to the third speaker mounting portion 121, may be provided to tilt toward the front or inside of the member 100.

In this way, as the other end of the first speaker mounting portion 123 and the other end of the second speaker mounting portion 124, which are not fixed to the third speaker mounting portion 121, are provided to tilt toward the front or inside of the member 100, sounds output from a plurality of speakers 125 installed in the first speaker mounting portion 123 and the second speaker mounting portion 124 may be further concentrated on the user.

Also, as the other end of the first speaker mounting portion 123 and the other end of the second speaker mounting portion 124, which are not fixed to the third speaker mounting portion 121, are provided to tilt toward the front or inside of the member 100, it is possible to maintain a constant distance between the plurality of speakers 125 and the user who sits in the chair in which the member 100 is installed.

As described above, the plurality of speakers 125 installed in the third speaker mounting portion 121, the first speaker mounting portion 123, and the second speaker mounting portion 124 may implement a multi-channel sound system by receiving and outputting a multi-channel sound signal from a separately-provided sound source (e.g., home theater, TV, set-top box, sound bar, computer, cellular phone, tablet PC, or the like).

Also, an interval adjusting device 150 may be installed in front of the main frame 110, and the interval adjusting device 150 serves to adjust an interval between the member 100 and the chair in which the member 100 is installed and fill a gap between the member 100 and the chair so that the member 100 can be stably fixed to the chair with the fixing devices 130 and 140 as media.

The interval adjusting device 150 may be installed in front of the main frame 110 and may include a moving portion 151 provided to be able to move upward and downward in the z-axis direction along the direction in which the main frame 110 extends and a support portion 152 installed in front of the moving portion 151 and configured to, for example, support a rear of a backrest portion B of the chair. The moving portion 151 moves the support portion 152 in the z-axis direction in consideration of specifications of the chair in which the member 100 is installed. In this way, the moving portion 151 allows the entire member 100 to be stably fixed while spaced at a certain interval apart from the rear of the chair.

Also, the moving portion 151 may be inserted and withdrawn in the y-axis direction and adjust the interval between the member 100 and the chair and may, by adjusting an angle of the main frame 110, adjust angles of the first speaker mounting portion 123, the second speaker mounting portion 124, and the third speaker mounting portion 121 installed on the main frame 110. The moving portion 151 may be inserted and withdrawn in the y-axis direction using a multi-stage structure, a compressible cylinder, a screw, or a groove and a protrusion.

The support portion 152 may tilt according to an angle of a backrest portion to come into close contact with the backrest portion. Also, the support portion 152 may be replaced with a woofer speaker 153, or the woofer speaker 153 may be mounted on the support portion 152. As the woofer speaker 153 is provided on the support portion 152, a more vivid sound can be transferred to the user.

Meanwhile, according to another aspect of the present invention, in a chair including at least 1) a headrest portion H configured to support a head part of a user, 2) the backrest portion B configured to support a back and waist part of the user, and 3) a seat portion S configured to support a buttocks part and a part of legs of the user, the member 100 may be installed in at least one selected from the headrest portion H, the backrest portion B, and the seat portion S to receive a multi-channel sound signal and implement a multi-channel sound system.

Figure 6:
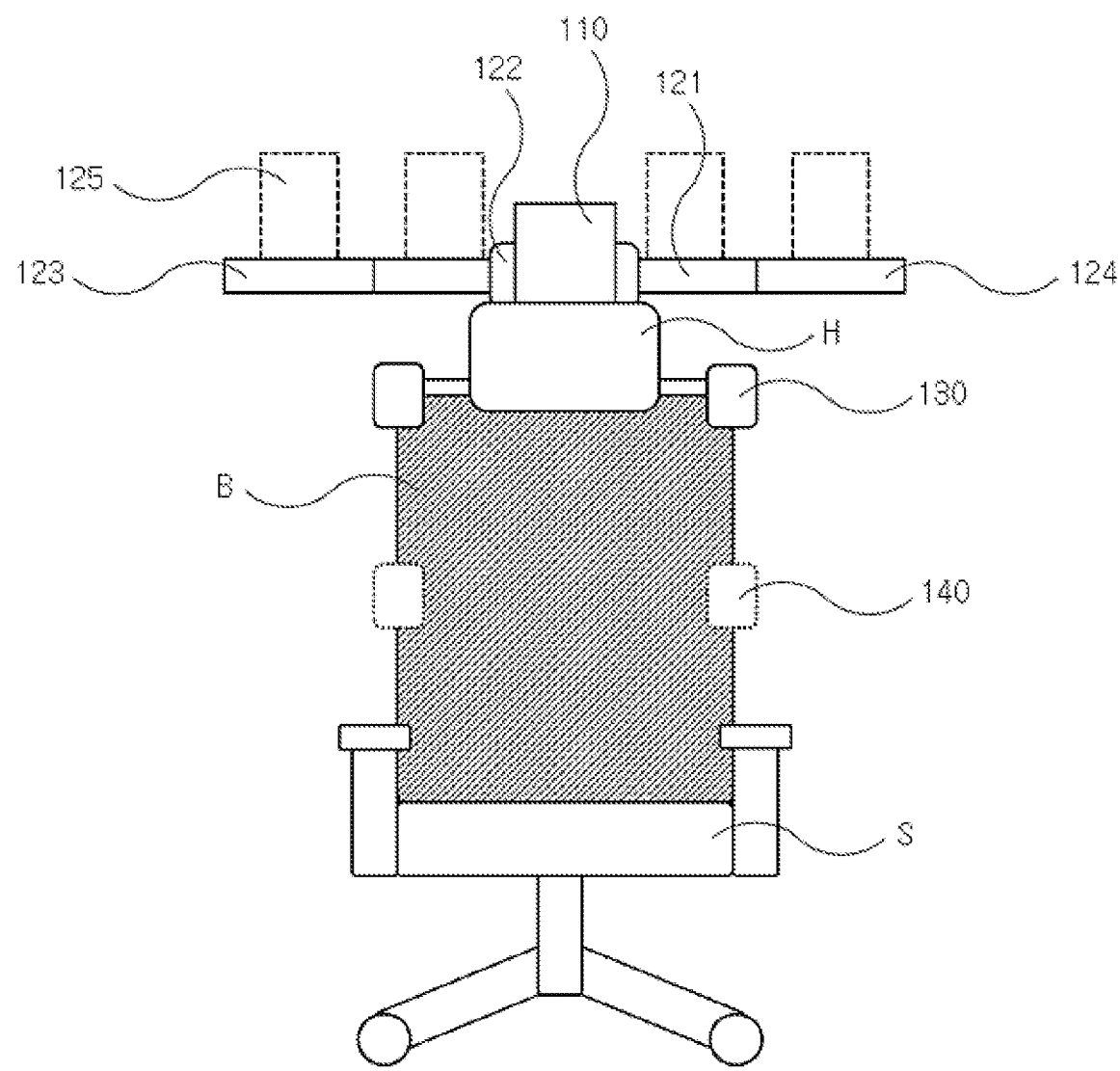
FIG. 6 is a front view of a chair in which the member illustrated in FIG. 3 is installed.
Figure 7:
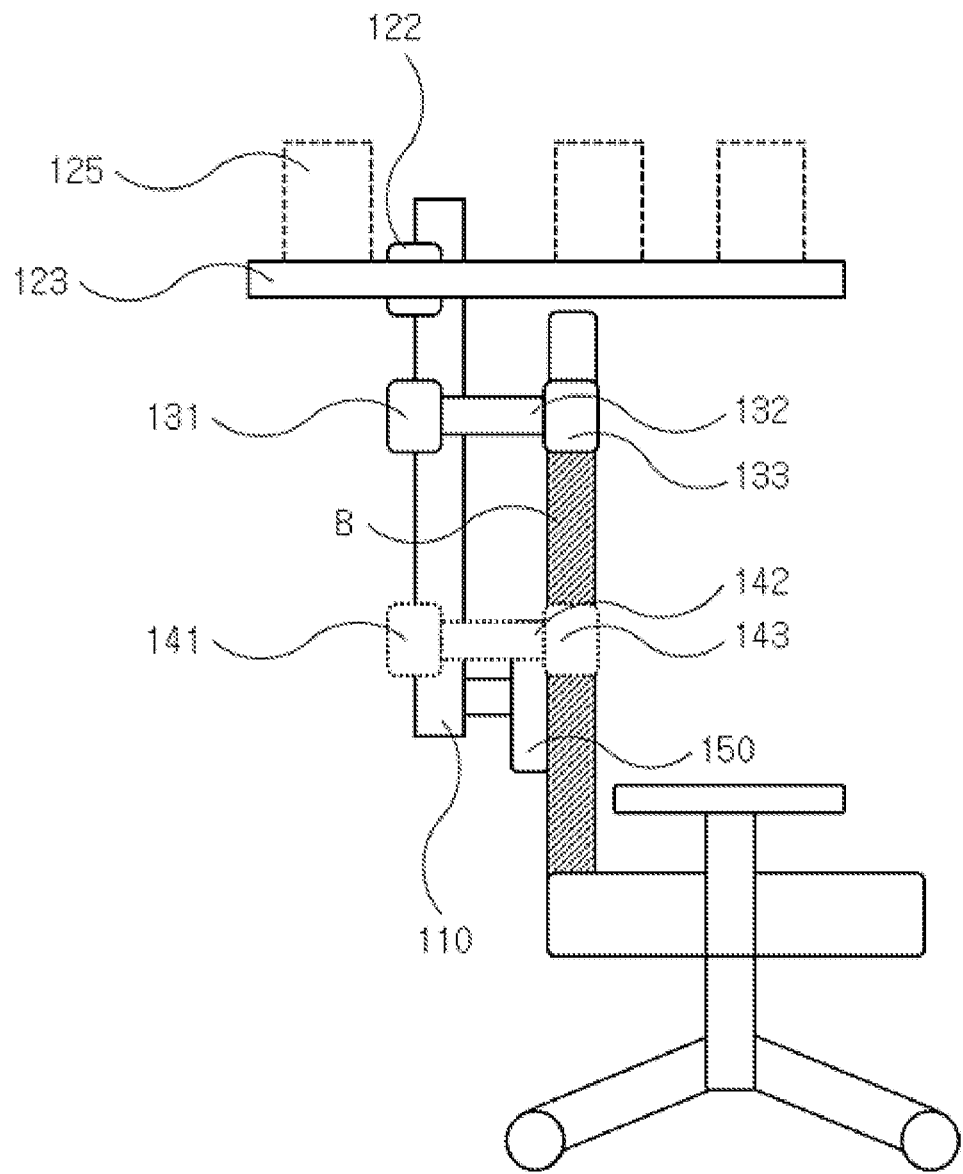
FIG. 7 is a lateral view of the chair in which the member illustrated in FIG. 3 is installed.
Figure 8:
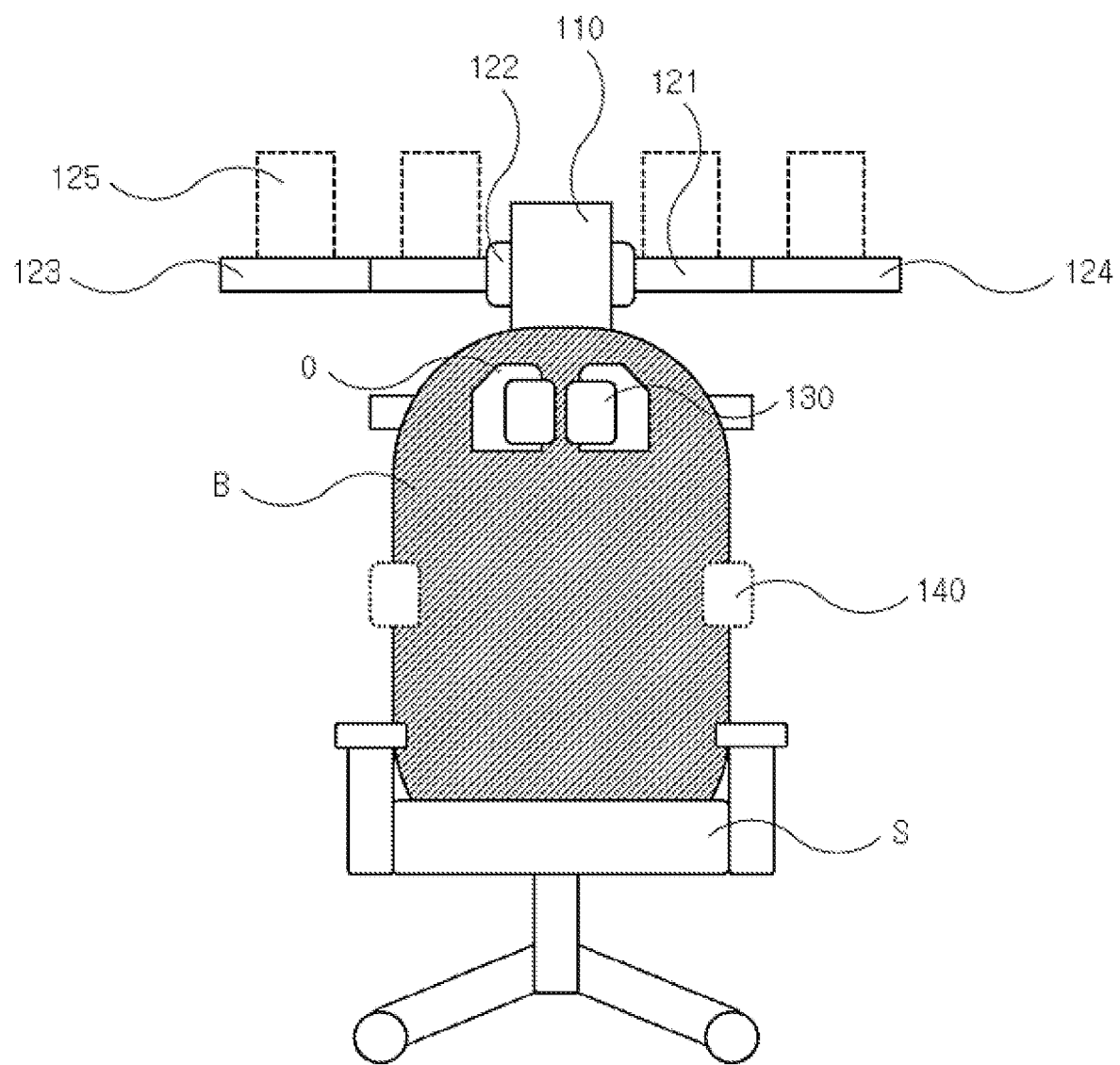
FIG. 8 is a front view of another chair in which the member illustrated in FIG. 3 is installed.

FIG. 6 is a front view of a chair in which the member illustrated in FIG. 3 is installed, FIG. 7 is a lateral view of the chair in which the member illustrated in FIG. 3 is installed, and FIG. 8 is a front view of another chair in which the member illustrated in FIG. 3 is installed. Although the chairs illustrated in FIGS. 6 to 8 are shown as movable chairs, the chair according to this application may be provided as a fixed type chair.

First, referring to FIGS. 6 and 7, the third speaker mounting portion 121, the first speaker mounting portion 123, and the second speaker mounting portion 124 installed directly or indirectly on the main frame 110 may be fixed to a chair with the fixing devices 130 and 140 as media.

Meanwhile, referring to FIG. 8, in the case of a chair having an opening O provided at a position where the user's head is supported, the member 100 may be fixed to the chair by a fixing operation of the fixing device 130 through the opening O.

The member 100 may be installed in at least one selected from the headrest portion H, the backrest portion B, and the seat portion S according to installation positions of the fixing devices 130 and 140 and specific fixing methods thereof. Hereinafter, a case in which the member 100 is installed in a vertically symmetrical manner in the backrest portion B will be described as an example.

The fixing devices may include a first fixing portion 130 configured to fix an upper portion of the chair (for example, a side portion of the headrest portion H or an upper portion of the backrest portion B) and a lateral portion of the chair (for example, a side portion of the backrest portion B). Also, in addition, the fixing devices may further include a second fixing portion 140 configured to fix the lateral portion of the chair (for example, the side portion of the backrest portion B), independently from the first fixing portion 130.

Here, the first fixing portion 130 and the second fixing portion 140 may respectively include moving portions 131 and 141 installed on the main frame 110 and configured to move upward and downward in the z-axis direction along the direction in which the main frame 110 extends, extending portions 132 and 142 formed to extend in the x-axis direction from both sides of the moving portions 131 and 141, and clamps 133 and 143 installed on one side of the extending portion 132 and one side of the extending portion 142, respectively.

The moving portions 131 and 141 move upward and downward in the z-axis direction along the direction in which the main frame 110 extends. In this way, the moving portions 131 and 141 allow a fixing method by the first fixing portion 130 and the second fixing portion 140 to be applied corresponding to various specifications of the chair in which the member 100 is installed.

The extending portions 132 and 142 may be provided on both sides of the moving portions 131 and 141. The extending portions 132 and 142 may each extend a predetermined length in the x-axis direction or may be formed of a flexible material and bent in various directions.

The clamps 133 and 143 may be installed on ends of the extending portions 132 and 142, respectively. The clamps 133 and 143 serve to, by clamping, grip and fix an edge of the backrest portion B or (if present) one side of a groove formed in an inside of the backrest portion B. The clamps 133 and 143 installed on the ends may be provided as a plurality of clamps 133 and 143 as necessary.

Also, when the backrest portion B has a shape that is curved in at least one of the x-axis, y-axis, and z-axis directions, at least one curve may be formed in between the extending portions 132 and 142 to match the shape of the backrest portion, thus supporting the backrest portion. Also, a screw fastening device may be further installed on the clamps to secure a support force.

FIGS. 9A to 14 schematically illustrate various operation examples of a first speaker mounting portion to a third speaker mounting portion which are applied to the member illustrated in FIG. 1 or 3.

Figure 9A:
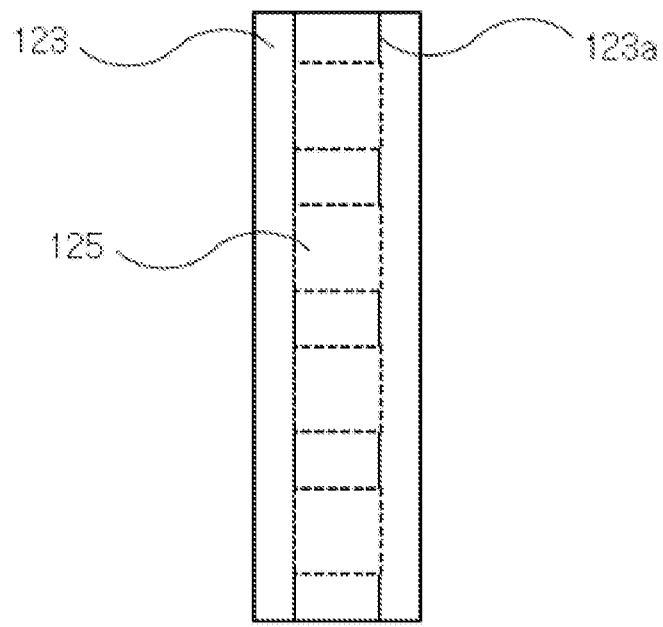
FIGS. 9A to 14 schematically illustrate various operation examples of a first speaker mounting portion to a third speaker mounting portion which are applied to the member illustrated in FIG. 1 or 3.
Figure 9B:
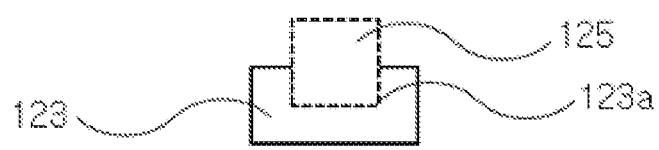
Figure 9C:
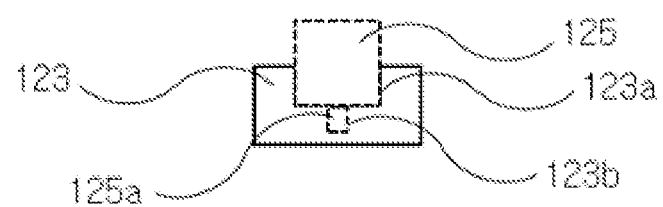

Although FIGS. 9A to 9C, for convenience, illustrate only the first speaker mounting portion 123, it should be understood that the content to be described with reference to FIGS. 9A to 9C is applicable equally to the third speaker mounting portion 121 and the second speaker mounting portion 124. Also, although FIGS. 9A to 14, for convenience, illustrate speakers as being installed on an upper portion of the first speaker mounting portion 123, speakers may be installed on a side portion or a lower portion of the first speaker mounting portion 123 as necessary.

Referring to FIGS. 9A and 9B, at least one speaker 125 installed on the upper portion of the first speaker mounting portion 123 may be installed to be slidably movable in a direction in which the first speaker mounting portion 123 extends. Accordingly, there is an advantage that each user may be allowed to customize a sound system for himself or herself by adjusting a position of the at least one speaker 125 installed in the first speaker mounting portion 123.

For example, an installation guide 123a that is bent inward may be formed on at least one speaker installation area defined in the first speaker mounting portion 123, and the at least one speaker 125 may slidably move while inserted a predetermined depth into the installation guide 123a.

Also, referring to FIG. 9C, a structure necessary for axial rotation of the speaker 125 may be installed. For example, a groove 123b for axial rotation may be provided in the installation guide 123a. An axial rotation member 125a of the at least one speaker 125 may be inserted into the groove 123b and may, while stably sliding in a direction in which the installation guide 123a extends, induce axial rotation of the at least one speaker 125.

In another case, a separate speaker mounting stand capable of axial rotation may be installed on the installation guide 123a, and the speaker 125 may be fixedly installed on the speaker mounting stand, or a groove may be formed in the first speaker mounting portion 123 in a direction in which the first speaker mounting portion 123 extends and a fixable screw may be installed on a lower end of the speaker mounting stand to allow sliding movement and axial movement thereof.

Figure 10A:
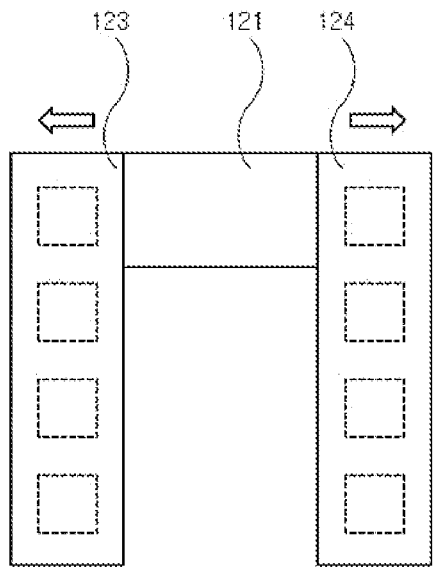
Figure 10B:
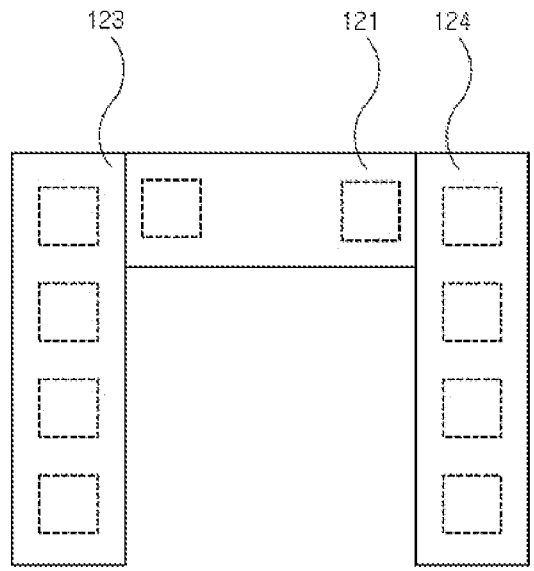
Figure 11A:
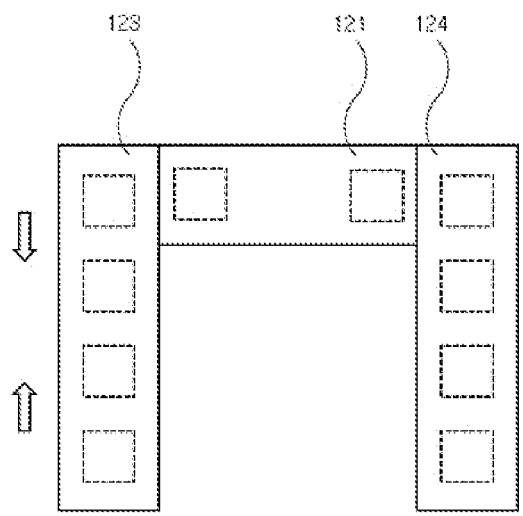
Figure 11B:
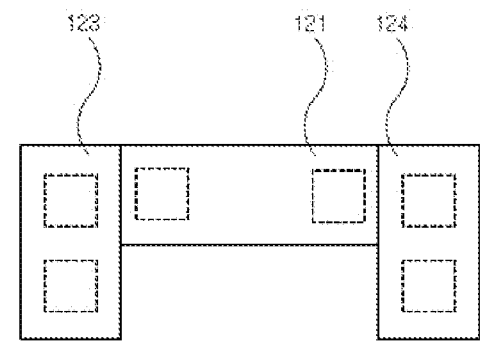

Meanwhile, referring to FIGS. 10A and 10B, the third speaker mounting portion 121 may be provided to be able to fold and unfold in the x-axis direction. Also, referring to FIGS. 11A and 11B, at least one of the first speaker mounting portion 123 and the second speaker mounting portion 124 may be provided to be able to fold and unfold in the y-axis direction. Accordingly, lengths of the third speaker mounting portion 121, the first speaker mounting portion 123, and the second speaker mounting portion 124 may be adjusted according to a left-right width or a front-rear length of the chair in which the member 100 is installed.

Figure 12:
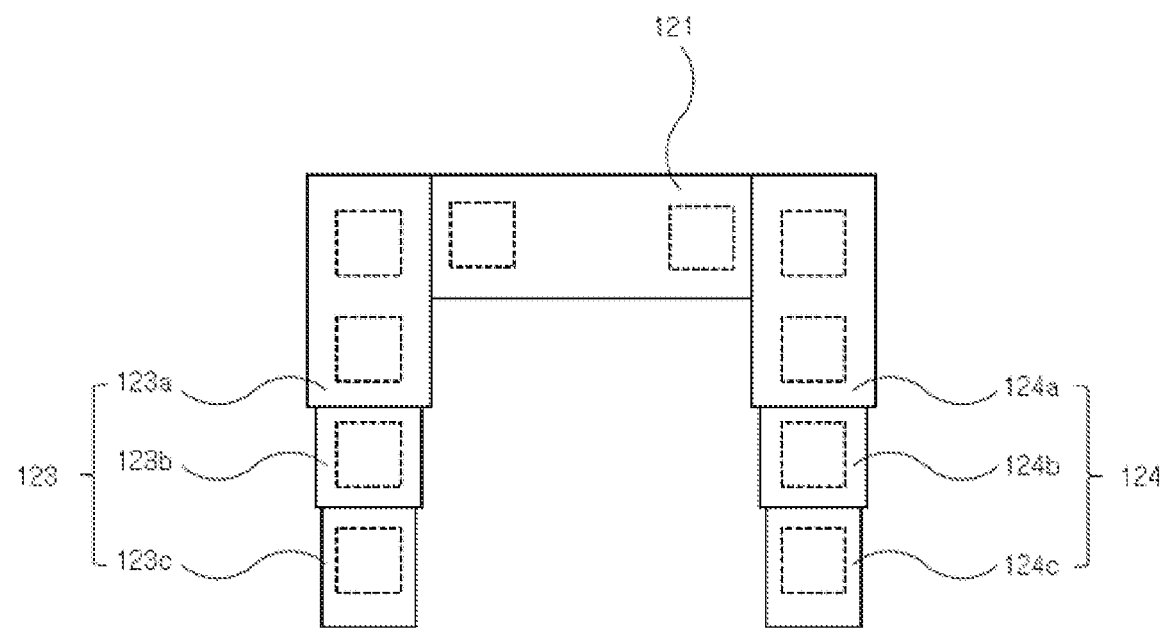

Also, referring to FIG. 12, at least one of the first speaker mounting portion 123 and the second speaker mounting portion 124 may be provided to be able to fold and unfold in multiple stages, and by the first speaker mounting portion 123 and the second speaker mounting portion 124 folding and unfolding in multiple stages, the number of areas 123a to 123c and 124a to 124c in which one or more speakers are installed on upper portions of the first speaker mounting portion 123 and the second speaker mounting portion 124 or intervals between the speakers may be adjusted.

Figure 13:
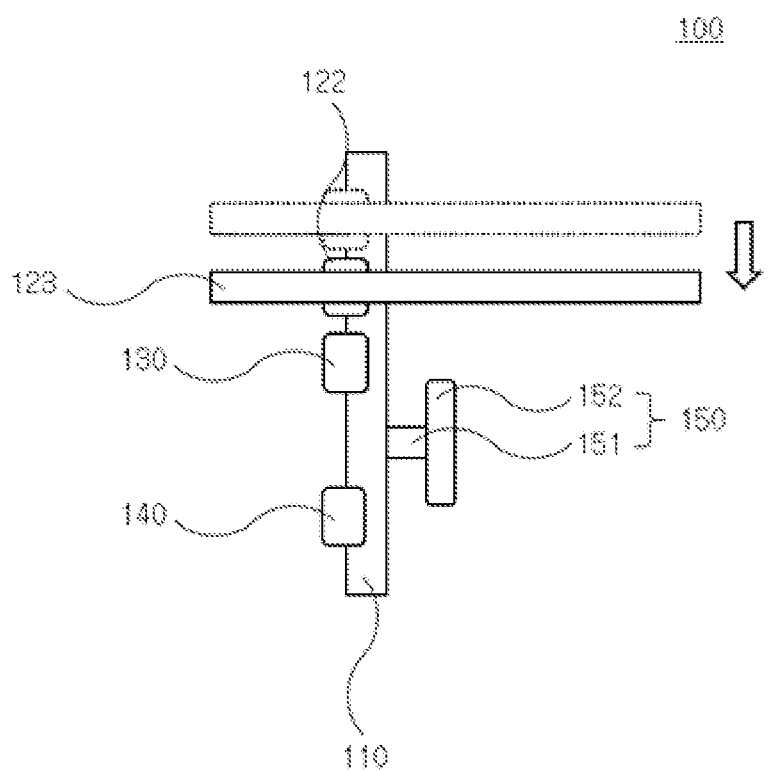

In addition, referring to FIG. 13, the first speaker mounting portion 123, the second speaker mounting portion 124, and the third speaker mounting portion 121 may be installed to be able to move upward and downward in the z-axis direction along the direction in which the main frame 110 extends.

To this end, the first speaker mounting portion 123, the second speaker mounting portion 124, and the third speaker mounting portion 121 may be installed on the main frame 110 with the moving portion 122 as a medium, and the moving portion 122 may be provided to be able to move upward and downward in the z-axis direction along the direction which the main frame 110 extends. When the moving portion 122 moves in the z-axis direction, the third speaker mounting portion 121, the first speaker mounting portion 123, and the second speaker mounting portion 124 which are installed directly or indirectly on the moving portion 122 may also move in the z-axis direction.

Figure 14:
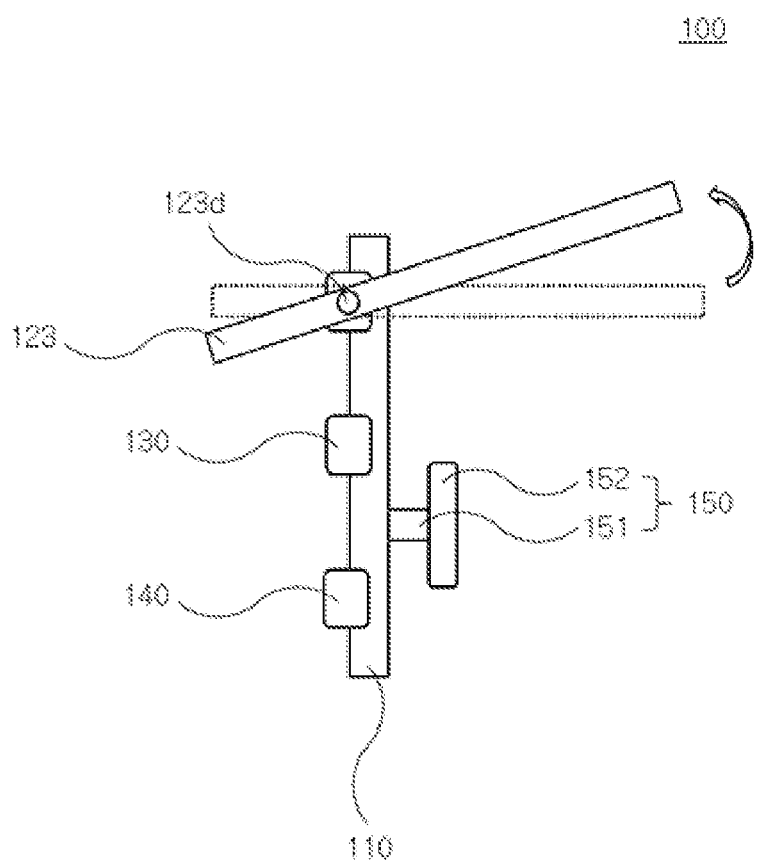

Meanwhile, referring to FIG. 14, at least one of the first speaker mounting portion 123, the second speaker mounting portion 124, and the third speaker mounting portion 121 may be provided to be able to tilt in the z-axis direction. To this end, the first speaker mounting portion 123 and the second speaker mounting portion 124 may be installed on the third speaker mounting portion 121 with a rotating device 123d as a medium. The rotating device 123d may be fixed while tilted at a certain angle. Also, in another example, when the rotating device 123d is provided on the main frame 110 or the moving portion 122, the third speaker mounting portion 121 may also be able to be tilted and fixed.

Figure 15A:
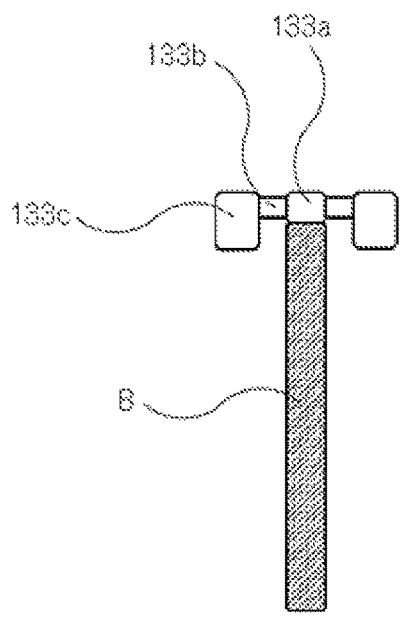
FIGS. 15A and 15B schematically illustrate a fixing operation of a first fixing portion applied to the member illustrated in FIG. 3.
Figure 15B:
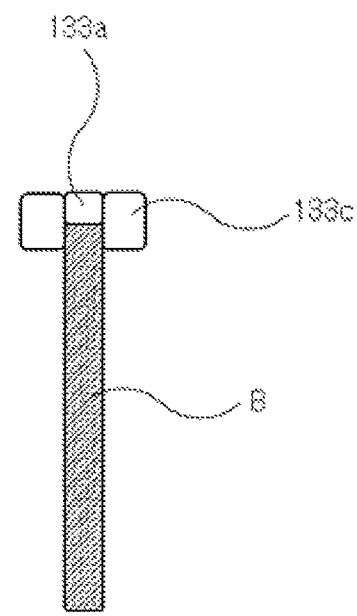
Figure 16A:
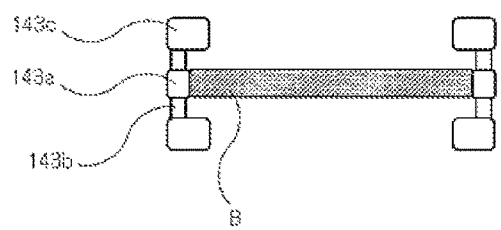
FIGS. 16A and 16B schematically illustrate a fixing operation of a second fixing portion applied to the member illustrated in FIG. 3.
Figure 16B:
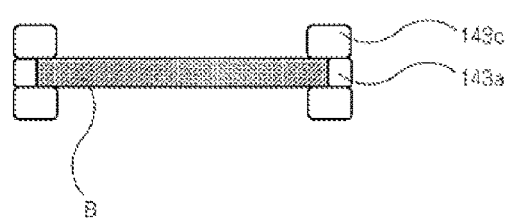

FIGS. 15A and 15B schematically illustrate a fixing operation of the first fixing portion 130 applied to the member illustrated in FIG. 3, and FIGS. 16A and 16B schematically illustrate a fixing operation of the second fixing portion 140 applied to the member illustrated in FIG. 3.

Referring to FIGS. 15A and 15B and FIGS. 16A and 16B, the first fixing portion 130 and the second fixing portion 140 may support the backrest portion B by a clamping method using the clamps 133 and 143, respectively. As one example of the clamping method, the clamp 133 used in the first fixing portion 130 may include a first support stand 133a, a first extension stand 133b, and a first fixing stand 133c, and by extension of the first extension stand 133b, the clamp 133 may correspond to various thicknesses of the backrest portion B. An elastic device may be applied to the first extension stand 133b, and when the first extension stand 133b extends to correspond to a thickness of an upper portion of the backrest portion B and then the first fixing stand 133c clamps the backrest portion B, the clamp 133 may grip the upper portion of the backrest portion B due to an elastic restoration force of the first extension stand 133b.

Likewise, the clamp 143 used in the second fixing portion 140 may include a second support stand 143a, a second extension stand 143b, and a second fixing stand 143c, and by extension of the second extension stand 143b, the clamp 143 may correspond to various thicknesses of the backrest portion B. An elastic device may be applied to the second extension stand 143b, and when the second extension stand 143b extends to correspond to a thickness of a side portion of the backrest portion B and then the second fixing stand 143c clamps the backrest portion B, the clamp 143 may grip the side portion of the backrest portion B due to an elastic restoration force of the second extension stand 143b.

As other clamping methods of the first fixing portion 130 and the second fixing portion 140, a knotting method, a groove-and-protrusion method, a screw-coupling method, or a method using a clamp in the form of a simple claw may be adopted.

Figure 17:
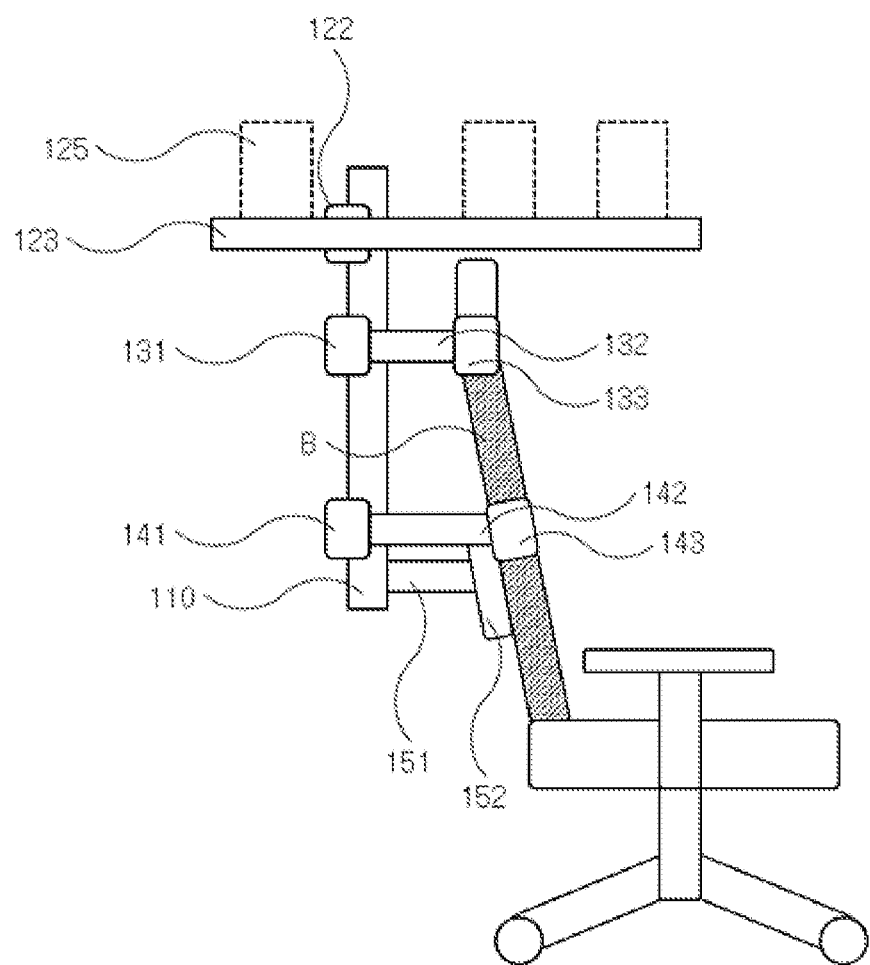
FIG. 17 illustrates another example of the chair in which the member illustrated in FIG. 3 is installed.

FIG. 17 illustrating another example of the chair in which the member illustrated in FIG. 3 is installed shows changes in a gripping method by the first fixing portion 130 and the second fixing portion 140 due to the backrest portion B of the chair tilting at a predetermined angle.

Referring to FIG. 17, a distance from the main frame 110 to the upper portion of the backrest portion B that is gripped by the first fixing portion 130 is different from a distance from the main frame 110 to the side portion of the backrest portion B that is gripped by the second fixing portion 140, and accordingly, the backrest portion B can be gripped according to changes in bending angles of the extending portion 132 of the first fixing portion 130 and the extending portion 142 of the second fixing portion 140 which are formed of a flexible material.

FIGS. 18 to 22 schematically illustrate various examples of a fixing device applied to the member illustrated in FIG. 3.

Referring to FIGS. 18 to 22, the first fixing portion 130 and the second fixing portion 140 may move upward and downward in the z-axis direction due to movement of the moving portions 131 and 141 installed on the main frame 110.

Meanwhile, the clamps 133 and 143 may be provided to be able to horizontally move and be fixed in the x-axis direction along the directions in which the extending portions 132 and 142 extend. Also, the clamps 133 and 143 may be provided to be able to tilt in the horizontal or vertical direction with rotating devices 134 and 135 and rotating devices 144 and 145, respectively, as media.

Figure 18:
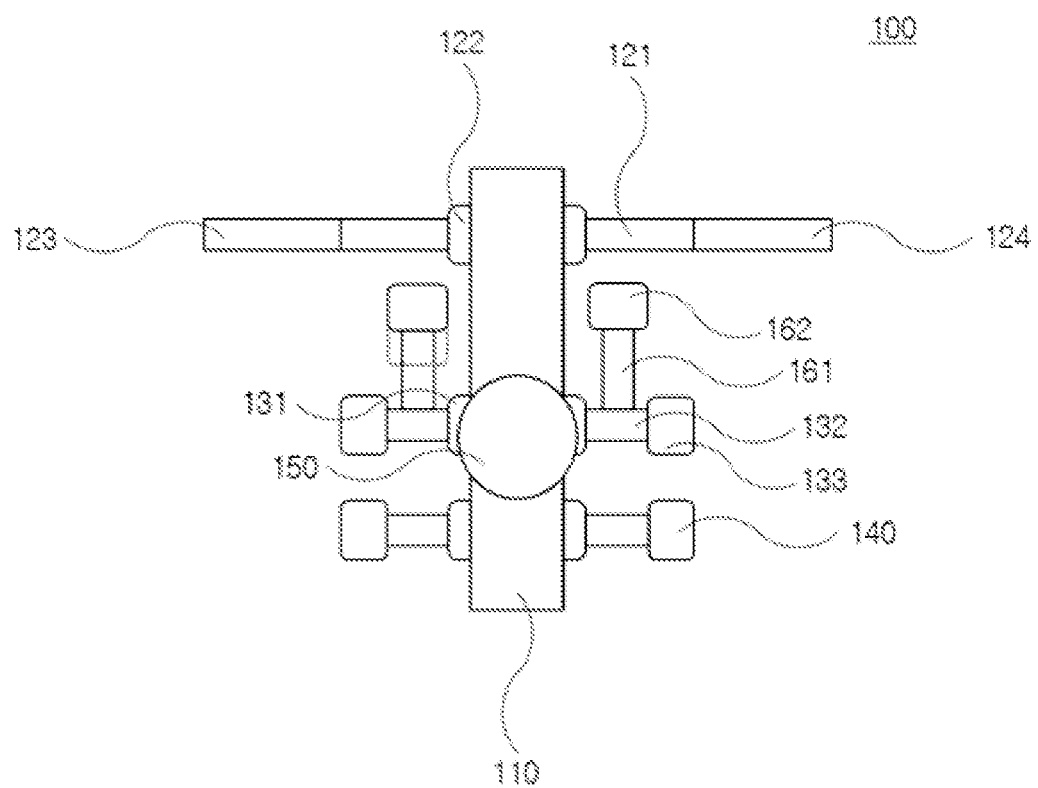
FIGS. 18 to 22 schematically illustrate various examples of a fixing device applied to the member illustrated in FIG. 3.
Figure 19:
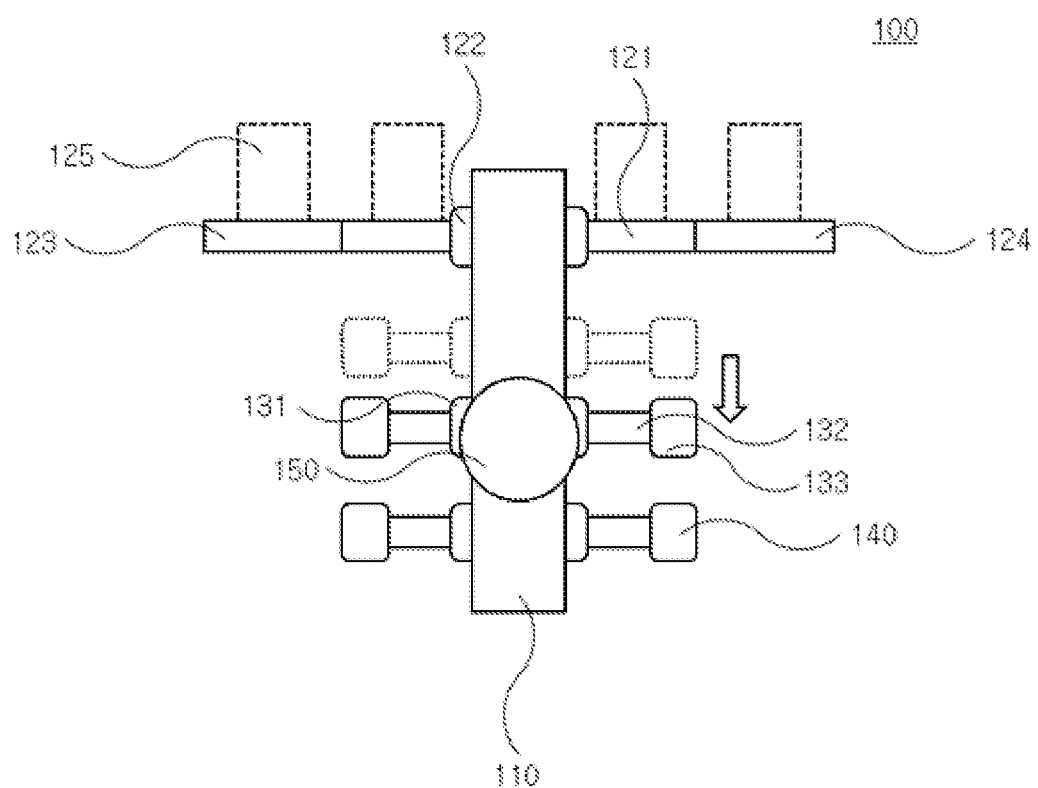
Figure 20:
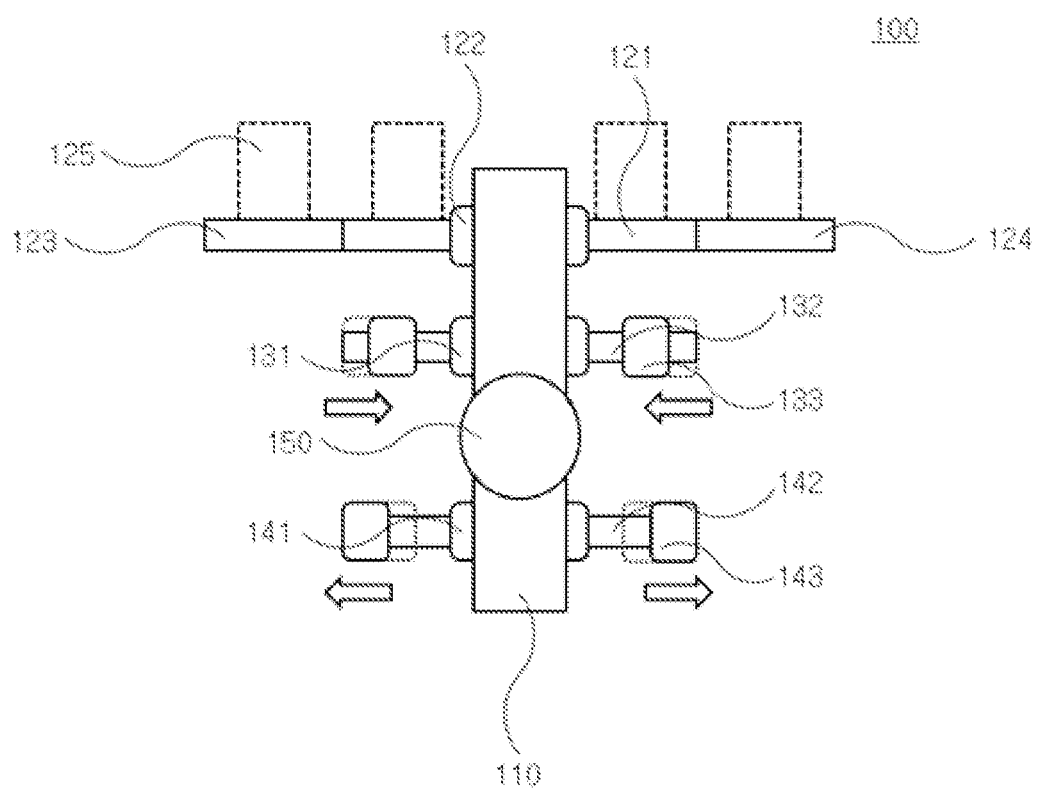
Figure 21:
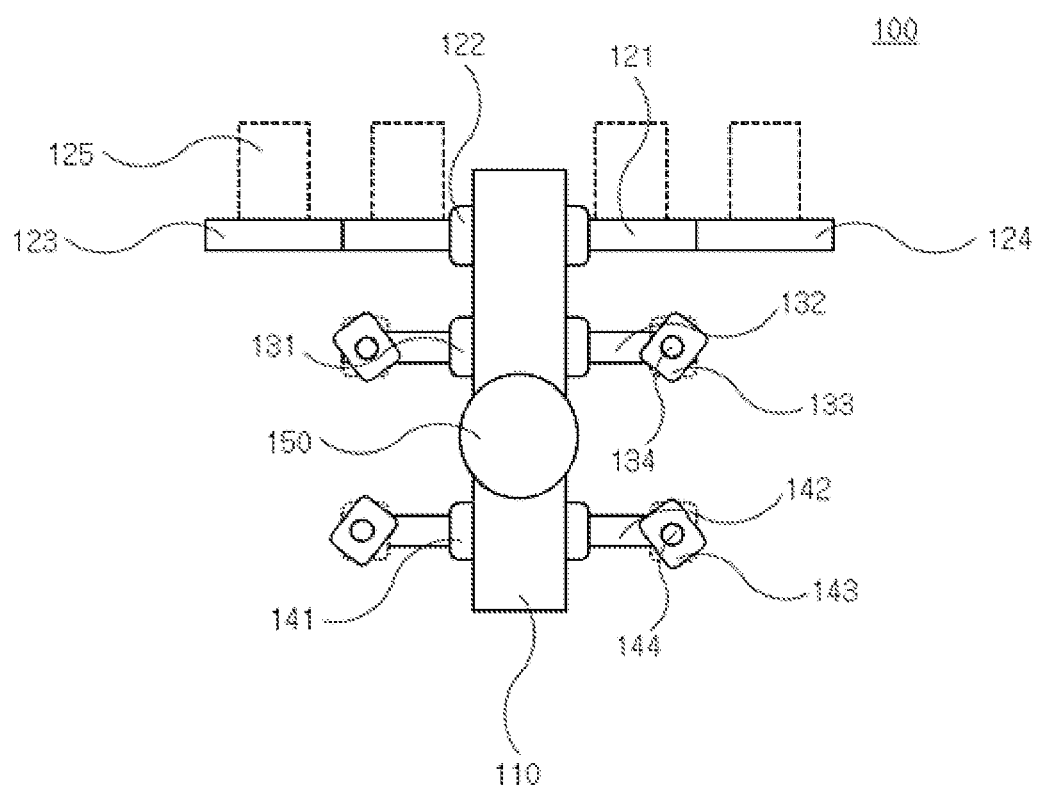
Figure 22:
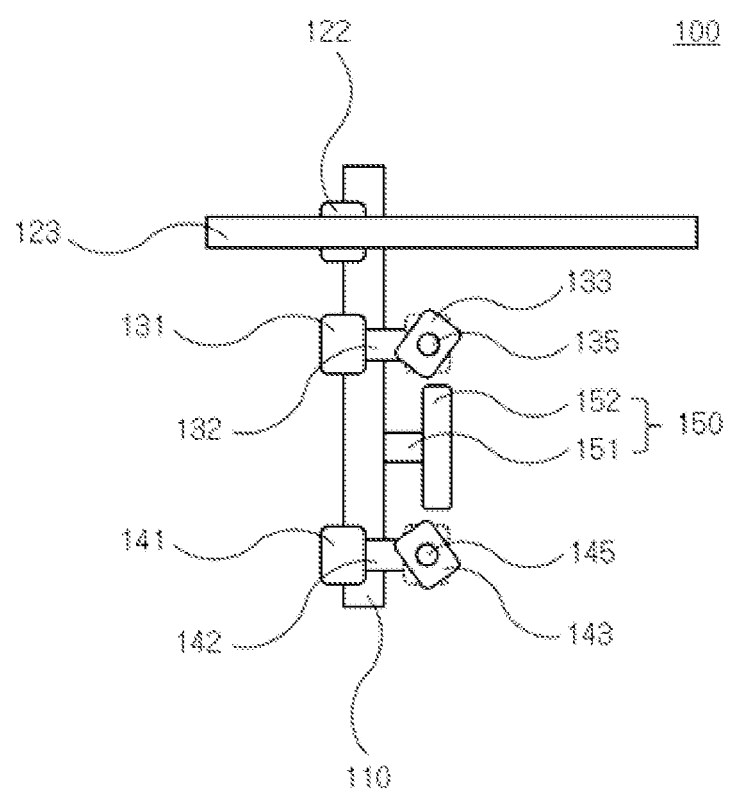

Also, referring to FIG. 18, at least one auxiliary fixing portion provided to protrude from at least one selected from the first fixing portion 130 and the second fixing portion 140 and configured to fix the member 100 to at least one area selected from an upper portion and a side portion of the chair may be further provided.

In FIG. 18, the auxiliary fixing portion may be installed in an arbitrary area of the first fixing portion 130. The auxiliary fixing portion includes an extending portion 161 installed in an arbitrary area of the first fixing portion 130 and a clamp 162 installed on one side of the extending portion, and since the clamp 162 is the same as the clamps of the first fixing portion 130 and the second fixing portion 140, detailed description thereof will be omitted for convenience.

Meanwhile, although FIG. 18 illustrates the extending portion 161 of the auxiliary fixing portion as being installed in an arbitrary area of the first fixing portion 130, the present invention is not necessarily limited thereto, and the extending portion 161 may be installed in an arbitrary area of the second fixing portion 140. Also, the clamp 162 may be able to move upward and downward in the z-axis direction along the extending portion 161. Also, the clamp 162 may be provided to be able to tilt in the horizontal or vertical direction with a separate rotating device as a medium.

Figure 23:
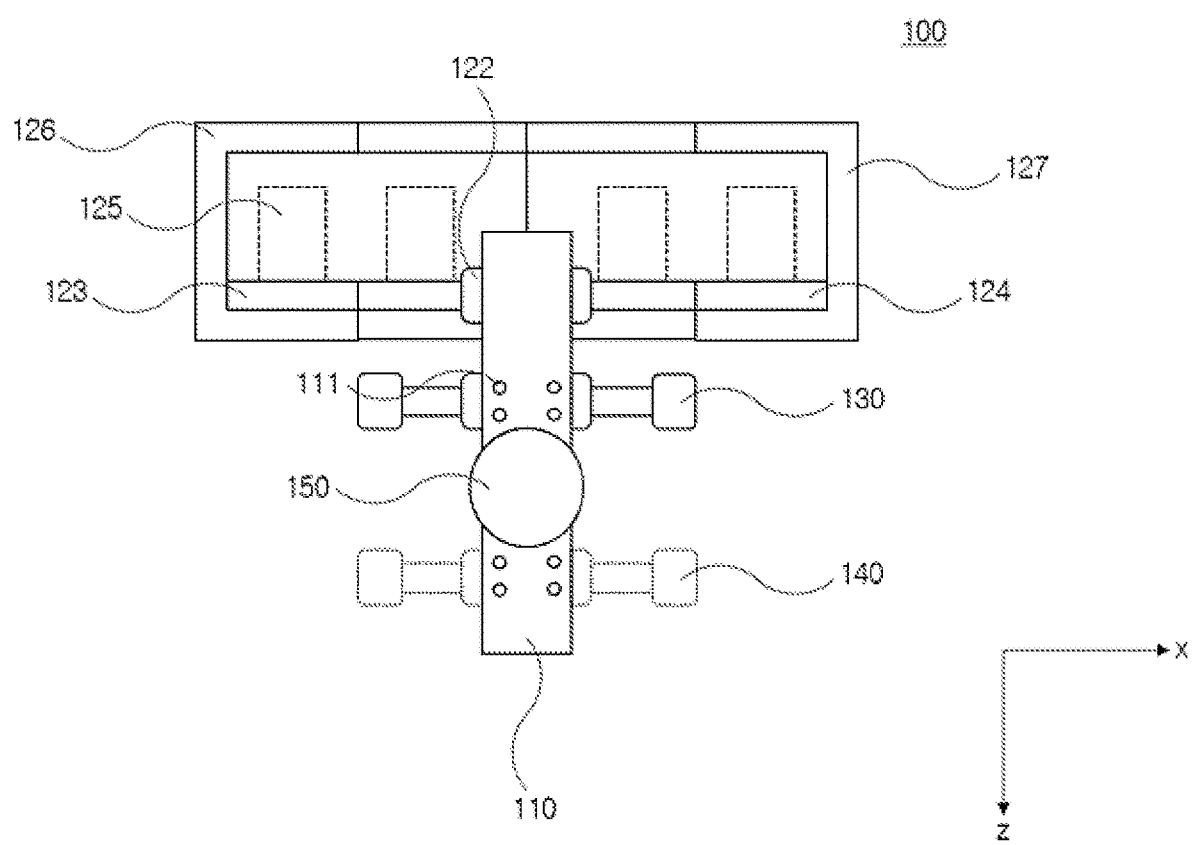
FIG. 23 is a front view of a member for a chair according to still another embodiment of the present invention.

FIG. 23 is a front view of a member for a chair according to still another embodiment of the present invention.

Referring to FIG. 23, at least one of the first speaker mounting portion 123, the second speaker mounting portion 124, and the third speaker mounting portion 121 may be provided in housing portions 126 and 127 having one open area.

As illustrated in FIG. 23, the housing portions 126 and 127 may be formed in an angular shape or a curved shape, and by being formed to surround an upper portion, a lower portion, and one side portion of the speaker 125 installed in at least one of the first speaker mounting portion 123, the second speaker mounting portion 124, and the third speaker mounting portion 121, the housing portions 126 and 127 may serve as resonators of sounds generated from inside.

Also, due to the housing portions 126 and 127 provided in a linear, curved, or angular shape, a sound generated from the speaker 125 may stay in a predetermined space instead of being immediately dispersed to a surrounding space, thus not only providing rich sound effects but also contributing to creating sound environments with a sense of space and a three-dimensional effect. Also, the sound output from the speaker 125 may be further concentrated on the user.

Figure 24:
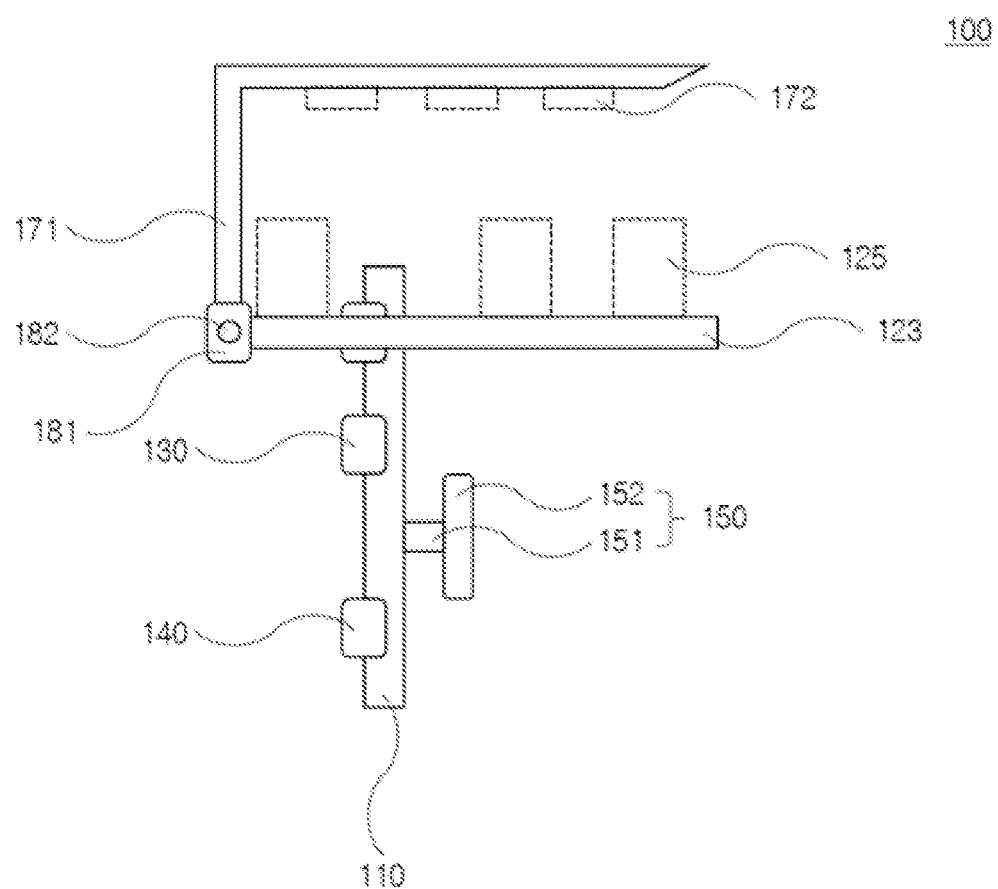
FIG. 24 is a lateral view of a member for a chair according to yet another embodiment of the present invention.

FIG. 24 is a lateral view of a member for a chair according to yet another embodiment of the present invention.

Referring to FIG. 24, the member 100 may further include a shell portion 171 installed in at least one of the third speaker mounting portion 121, the first speaker mounting portion 123, and the second speaker mounting portion 124.

The shell portion 171 may open and close an upper space divided on the basis of the third speaker mounting portion 121, the first speaker mounting portion 123, and the second speaker mounting portion 124 and, accordingly, may allow the user who sits in the chair to experience sound environments with a greater three-dimensional effect in a closed space.

Here, when it is assumed that the third speaker mounting portion 121, the first speaker mounting portion 123, and the second speaker mounting portion 124 are installed on a single plane in the member 100 illustrated in FIGS. 1 and 2, the upper space divided on the basis of the third speaker mounting portion 121, the first speaker mounting portion 123, and the second speaker mounting portion 124 may refer to an arbitrary space disposed above the plane on which the third speaker mounting portion 121, the first speaker mounting portion 123, and the second speaker mounting portion 124 are installed.

The shell portion 171 provided in a linear, curved, or angular shape may, by opening or closing the upper space as necessary, create relatively closed sound environments when closing the upper space and allow the user to experience sound environments with a greater three-dimensional effect. Meanwhile, the shell portion 171 may, by opening the upper space, prevent the user from being uncomfortable when the user gets up from the chair in which the member 100 is installed.

The shell portion 171 may be installed in at least one of the third speaker mounting portion 121, the first speaker mounting portion 123, and the second speaker mounting portion 124 with a separate fixing device 181 as a medium, and the fixing device 181 may be opened and closed within a predetermined angle range by a rotating device 182.

Also, an area in which at least one speaker 172 is installed is defined inside the shell portion 171, and in this way, sound may also be output from an upper space on the basis of the user who sits in the chair in which the member 100 is installed.

Embodiments of the present invention have been described above, but those of ordinary skill in the art may make various modifications and changes to the present invention by adding, changing, or omitting components within the scope not departing from the spirit of the present invention, and such modifications and changes also belong to the scope of rights of the present invention.

What is claimed is:

1. A member for a chair for implementing a multi-channel sound system, the member comprising:
   at least one main frame provided to extend in a z-axis direction;
   a first speaker mounting portion on one side and a second speaker mounting portion on an opposite side of the main frame, the first speaker mounting portion and the second mounting portion extend forward in a y-axis direction from the main frame while being spaced apart from each other, and in which an area for installing at least one speaker is defined;
   one or more fixing devices provided on the main frame and configured to fix the main frame to a chair,
   wherein at least one speaker is mounted on an upper portion of a speaker installation area defined in each of the first speaker mounting portion and the second speaker mounting portion; and
   an interval adjusting device installed in front of the main frame to be able to inserted and withdrawn in the y-axis direction and configured to adjust an interval between the main frame and the chair in the y-axis direction.

2. The member of claim 1, wherein the first speaker mounting portion and the second speaker mounting portion are installed to be able to move upward and downward in the z-axis direction along a direction in which the main frame extends.

3. The member of claim 1, wherein at least one of the first speaker mounting portion and the second speaker mounting portion is provided to have an adjustable extension length.

4. The member of claim 1, wherein a speaker installation guide that is bent inward is formed on at least one speaker installation area defined in the first speaker mounting portion and the second speaker mounting portion.

5. The member of claim 4, wherein at least one speaker is slidably movable along the speaker installation guide.

6. The member of claim 4, wherein at least one speaker is axially rotatable while installed in the speaker installation area.

7. The member of claim 1, further comprising a third speaker mounting portion which is installed on the main frame, provided to extend in an x-axis direction, and in which an area for installing at least one speaker is defined,
wherein one end portion of the first speaker mounting portion and one end portion of the second speaker mounting portion are respectively installed on both sides of the third speaker mounting portion.

8. The member of claim 7, wherein the third speaker mounting portion is installed to be able to move upward and downward in the z-axis direction along the direction in which the main frame extends.

9. The member of claim 7, wherein the third speaker mounting portion is provided to have an adjustable extension length.

10. The member of claim 7, wherein a speaker installation guide that is bent inward is formed on a speaker installation area defined in the third speaker mounting portion.

11. The member of claim 1, wherein at least one of the first speaker mounting portion and the second speaker mounting portion is provided to be able to tilt in the z-axis direction.

12. The member of claim 1, wherein the fixing devices include a first fixing portion configured to fix the member to at least one area selected from an upper portion and a side portion of the chair.

13. The member of claim 12, wherein the fixing devices further include a second fixing portion configured to fix the member to the side portion of the chair, independently from the first fixing portion.

14. The member of claim 13, wherein the fixing devices further include at least one auxiliary fixing portion provided to protrude from at least one selected from the first fixing portion and the second fixing portion and configured to fix the member to at least one area selected from the upper portion and the side portion of the chair.

15. The member of claim 1, wherein the interval adjusting device is installed to be able to move upward and downward in the z-axis direction along the direction in which the main frame extends.

16. A chair comprising at least 1) a headrest portion configured to support a head part of a user, 2) a backrest portion configured to support a back and waist part of the user, and 3) a seat portion configured to support a buttocks part and a part of legs of the user,
the chair having the member of claim 1 installed in at least one selected from the headrest portion, the backrest portion, and the seat portion to receive a multi-channel sound signal and implement a multi-channel sound system.

17. A member for a chair for implementing a multi-channel sound system, the member comprising:
at least one main frame provided to extend in a z-axis direction;
a first speaker mounting portion on one side and a second speaker mounting portion on an opposite side of the main frame, the first speaker mounting portion and the second mounting portion extend forward in a y-axis direction from the main frame while being spaced apart from each other, and in which an area for installing at least one speaker is defined;
one or more fixing devices provided on the main frame and configured to fix the main frame to a chair,
wherein at least one speaker is mounted on an upper portion of a speaker installation area defined in each of the first speaker mounting portion and the second speaker mounting portion; and
a third speaker mounting portion which is installed on the main frame, provided to extend in an x-axis direction, and in which an area for installing at least one speaker is defined,
wherein one end portion of the first speaker mounting portion and one end portion of the second speaker mounting portion are respectively installed on both sides of the third speaker mounting portion,
wherein a speaker installation guide that is bent inward is formed on a speaker installation area defined in the third speaker mounting portion, and
wherein the speaker is slidably movable along the speaker installation guide or is axially rotatable while installed in the speaker installation area.

18. A member for a chair for implementing a multi-channel sound system, the member comprising:
at least one main frame provided to extend in a z-axis direction;
a first speaker mounting portion on one side and a second speaker mounting portion on an opposite side of the main frame, the first speaker mounting portion and the second mounting portion extend forward in a y-axis direction from the main frame while being spaced apart from each other, and in which an area for installing at least one speaker is defined;
one or more fixing devices provided on the main frame and configured to fix the main frame to a chair,
wherein at least one speaker is mounted on an upper portion of a speaker installation area defined in each of the first speaker mounting portion and the second speaker mounting portion; and
wherein the fixing devices include a first fixing portion configured to fix the member to at least one area selected from an upper portion and a side portion of the chair,
wherein the fixing devices further include a second fixing portion configured to fix the member to the side portion of the chair, independently from the first fixing portion,
wherein the first fixing portion and the second fixing portion include:
moving portions installed on the main frame and configured to move upward and downward in the z-axis direction along the direction in which the main frame extends;
extending portions formed to extend in an x-axis direction from both sides of the moving portions; and
clamps installed on one side of the extending portions.

* * * * *